(12) United States Patent
Stählin et al.

(10) Patent No.: US 11,411,727 B2
(45) Date of Patent: Aug. 9, 2022

(54) METHOD FOR IMPROVING THE UTILIZATION RATE OF A VEHICLE-TO-X COMMUNICATION DEVICE AND VEHICLE-TO-X COMMUNICATION DEVICE

(71) Applicant: Continental Teves AG & Co. oHG, Frankfurt am Main (DE)

(72) Inventors: Ulrich Stählin, Rochester, MI (US); Marc Menzel, Weimar (DE)

(73) Assignee: Continental Teves AG & Co. oHG

( * ) Notice: Subject to any disclaimer, the term of this patent is extended or adjusted under 35 U.S.C. 154(b) by 267 days.

(21) Appl. No.: 16/543,725

(22) Filed: Aug. 19, 2019

(65) Prior Publication Data

US 2020/0084031 A1 Mar. 12, 2020

(30) Foreign Application Priority Data

Sep. 6, 2018 (DE) ...................... 10 2018 215 141.5

(51) Int. Cl.
*H04L 29/06* (2006.01)
*H04L 9/08* (2006.01)
*H04L 9/32* (2006.01)
*H04W 4/44* (2018.01)

(52) U.S. Cl.
CPC .......... *H04L 9/0877* (2013.01); *H04L 9/3263* (2013.01); *H04W 4/44* (2018.02)

(58) Field of Classification Search
CPC ... H04L 9/0877; H04L 9/3263; H04L 9/3252; H04L 9/088; H04L 2209/84; H04L 2209/42; H04W 4/44; H04W 12/041; H04W 12/106; H04W 4/40; H04W 12/02; H04W 12/069

See application file for complete search history.

(56) References Cited

U.S. PATENT DOCUMENTS

| | | | |
|---|---|---|---|
| 9,485,247 B2* | 11/2016 | Goudy | H04L 63/068 |
| 9,735,970 B1* | 8/2017 | Shohat | H04L 9/321 |
| 10,027,490 B2* | 7/2018 | Tschache | H04L 9/3268 |

(Continued)

FOREIGN PATENT DOCUMENTS

| | | | |
|---|---|---|---|
| DE | 102010029418 A1 * | 12/2010 | ......... H04L 63/0492 |
| DE | 102010029418 A1 | 12/2010 | |

(Continued)

OTHER PUBLICATIONS

German Search Report for German Application No. 10 2018 215 141.5, dated May 24, 2019—10 pages.

*Primary Examiner* — Jeremy S Duffield
*Assistant Examiner* — Hassan A Hussein
(74) *Attorney, Agent, or Firm* — RatnerPrestia

(57) ABSTRACT

A method for improving the utilization rate of a vehicle-to-X communication device for vehicle-to-X communication, having the steps: receipt of digital certificates by the vehicle-to-X communication device, generation of cryptographic keys for signing vehicle-to-X messages to be emitted using the digital certificates by an electronic computing apparatus, temporal spacing of the receipt of the digital certificates by the vehicle-to-X communication device, and generation of the cryptographic keys using the digital certificates. Furthermore, a vehicle-to-X communication device and use of the device in a vehicle or an infrastructure apparatus is provided.

12 Claims, 2 Drawing Sheets

(56) References Cited

U.S. PATENT DOCUMENTS

| | | | |
|---|---|---|---|
| 10,454,689 B1* | 10/2019 | Sharifi Mehr | H04L 63/166 |
| 10,536,279 B2* | 1/2020 | Simplicio, Jr. | H04L 63/0823 |
| 10,595,200 B2* | 3/2020 | Etzel | G06F 21/602 |
| 10,623,921 B2* | 4/2020 | Stählin | H04L 63/0823 |
| 11,050,238 B2* | 6/2021 | Boros | H02H 9/025 |
| 2004/0221158 A1* | 11/2004 | Olkin | H04L 9/3236 |
| | | | 713/170 |
| 2010/0180123 A1* | 7/2010 | Kopetz | H04L 63/1408 |
| | | | 713/168 |
| 2012/0095920 A1* | 4/2012 | McQuade | H04L 9/3226 |
| | | | 713/168 |
| 2013/0111203 A1* | 5/2013 | Baltes | G06F 21/57 |
| | | | 713/100 |
| 2013/0238895 A1* | 9/2013 | Dixon | H04L 9/3268 |
| | | | 713/156 |
| 2016/0197797 A1* | 7/2016 | Grotendorst | H04L 43/028 |
| | | | 370/465 |
| 2016/0264071 A1* | 9/2016 | Ujiie | H04L 63/067 |
| 2016/0315766 A1* | 10/2016 | Ujiie | H04L 9/083 |
| 2016/0328972 A1* | 11/2016 | Stählin | H04L 67/18 |
| 2017/0012774 A1* | 1/2017 | Antoni | H04W 12/10 |
| 2017/0359184 A1* | 12/2017 | Camenisch | H04L 63/0823 |
| 2018/0220282 A1* | 8/2018 | Stahlin | H04L 63/0823 |
| 2018/0241739 A1* | 8/2018 | Takazoe | G06F 21/44 |
| 2018/0375853 A1* | 12/2018 | Jungk | H04W 12/069 |
| 2019/0028448 A1* | 1/2019 | Farrell | H04L 67/12 |
| 2019/0123915 A1* | 4/2019 | Simplicio, Jr. | H04L 63/0823 |
| 2019/0294815 A1* | 9/2019 | Palukuru | G06F 21/33 |
| 2019/0342275 A1* | 11/2019 | Olive | G07C 5/008 |
| 2020/0153625 A1* | 5/2020 | Schaap | H04L 9/0819 |
| 2021/0197813 A1* | 7/2021 | Houston | G06N 3/08 |
| 2021/0202778 A1* | 7/2021 | Jacob | H01L 31/1812 |
| 2021/0342785 A1* | 11/2021 | Mann | G06F 11/3409 |

FOREIGN PATENT DOCUMENTS

| | | | | |
|---|---|---|---|---|
| DE | 102014204044 A1 | 9/2015 | | |
| DE | 102017012249 A1 * | 3/2019 | | G06F 21/31 |

* cited by examiner

METHOD FOR IMPROVING THE UTILIZATION RATE OF A VEHICLE-TO-X COMMUNICATION DEVICE AND VEHICLE-TO-X COMMUNICATION DEVICE

CROSS REFERENCE TO RELATED APPLICATION

This application claims priority to German Patent Application No. 10 2018 215 141.5, filed Sep. 6, 2018, the contents of such application being incorporated by reference herein.

FIELD OF THE INVENTION

The present invention relates to a method for improving the utilization rate of a vehicle-to-X communication device for vehicle-to-X communication and a vehicle-to-X communication device.

BACKGROUND OF THE INVENTION

Vehicle-to-X communication is currently moving towards series production. It in particular provides vehicles with the possibility of emitting vehicle-to-X messages, at given distances or indeed in the event of certain incidents, these messages for example comprising information about speed, position, route, acceleration or particular incidents such as for example breakdowns or emergency braking maneuvers. The currently applicable standards are IEEE802.11(p), IEEE1609, SAE 2735, SAE 2945 and ETSI ITS-G5. New 3GPP standards for cellular V2X (C-V2X) are also currently being drawn up. For data security, signature on the basis of a public key infrastructure (PKI) with elliptic curve cryptography (*"Elliptic Curve Digital Signature Algorithm"*, ECDSA) and changing certificates is frequently used.

In vehicle-to-X communication, changing certificates, or "pseudonyms", are preferably used. Hence the name "pseudonym certificates" (or PC), which is also used. It is thereby made possible to identify changes during transfer on the air interface while nonetheless maintaining sender anonymity. The necessary certificates are obtained by a sender from a server which is part of a PKI (*"Public Key Infrastructure"*). In particular as a function of memory availability, as early as during production these certificates are loaded into a relevant controller for part of an intended vehicle utilization period or optionally the entire vehicle utilization period. Otherwise, there are various methods for transferring new certificates into the controller during the vehicle utilization time.

The key for signing vehicle-to-X messages to be emitted is then reconstructed from the certificates obtained. A disadvantage of this is that the operation is comparatively heavy on computing power and takes up a correspondingly long time if there is a large number of certificates, making use of an underlying vehicle-to-X communication device during this period frequently impossible or possible only to a very limited degree, since the keys intended for the signature of vehicle-to-X messages to be emitted or the computing resources required for the processing of vehicle-to-X messages cannot be provided during this period.

SUMMARY OF THE INVENTION

An aspect of the invention is a method and a vehicle-to-X communication device which overcome the above-stated disadvantages. In particular, however, it is intended to enable an improved possible utilization rate for the vehicle-to-X communication.

An aspect of the invention is a method for improving the utilization rate of a vehicle-to-X communication device for vehicle-to-X communication, having the steps:

receipt of digital certificates by the vehicle-to-X communication device, generation of cryptographic keys for signing vehicle-to-X messages to be emitted using the digital certificates by means of an electronic computing apparatus, wherein temporal spacing of the receipt of the digital certificates by the vehicle-to-X communication device and generation of the cryptographic keys using the digital certificates is provided.

The concept underlying an aspect of the invention is that of undertaking temporal separation of the storage or updating of the digital certificates and the generation of the cryptographic keys from the certificates, whereby use of the electronic computing unit or vehicle-to-X communication device during the process of updating the certificates, subsequent to production of the keys, is not significantly limited and the keys needed for the emission of vehicle-to-X messages may nonetheless be provided. This is advantageous for example during a production process of the vehicle-to-X communication device or a vehicle comprising this device in which a comparatively large number of certificates is loaded into the device at once. According to the prior art, this would result in comparatively long cycle times. The lack of downtime for key generation results in a better possible utilization rate of the electronic computing apparatus and thus for the vehicle-to-X communication. When a corresponding vehicle is being operated, traffic safety, which is assessed with regard to quality by the vehicle-to-X communication, may thus be maintained even in the case of certificate updating. The certificates may conveniently be pseudonym certificates for establishing the authenticity and/or integrity of a sender of emitted vehicle-to-X messages. On the basis of the cryptographic key, a receiver of an emitted vehicle-to-X message may moreover verify the authenticity or integrity of the sender of the vehicle-to-X message.

The vehicle-to-X communication device may receive the digital certificates for example by means of a receiving apparatus with an antenna from an external apparatus, for example a central server apparatus ("backend server"), and/or in wired manner, for example via a data bus.

In one embodiment, temporal spacing is configured as required with regard to a respective certificate and/or key.

According to one embodiment, the temporal spacing is configured as a function of a respective validity period, in particular of the start of the respective validity period, of a respective certificate.

The temporal spacing of receipt of the digital certificates and generation of the keys is preferably accordingly configured in such a way that generation of a respective key is shifted temporally from the time of receipt of the certificates towards an actual and/or probable time of use of a respective certificate and/or of the respective key.

According to a further development, generation of a respective key using a respective certificate proceeds directly prior to the start of a validity period of a respective certificate and/or directly subsequent to the start of a validity period of a respective certificate. In other words, the keys are generated when needed. For example, a pending start of a validity period of a certificate following on from a currently valid certificate may be identified by the electronic computing apparatus and generation of a key from the following certificate started. The actual generation process may in this case optionally also run into the validity period.

According to one embodiment, the electronic computing apparatus determines, in particular during a validity period of a current certificate, the start of a validity period of a certificate respectively subsequent to the current certificate and initiates generation of a respective key such that generation is completed prior to start of the validity period of the respectively subsequent certificate.

According to one embodiment, in the event of the computing capacity of the electronic computing unit not being fully utilized, keys for future vehicle-to-X message signatures are produced, in particular also keys for certificates. For example, keys are produced which will be used only in a few hours for the signature process. Advantageously, it is thus possible to ensure that, despite limited computing capacity of the electronic computing unit, the keys needed for the vehicle-to-X communication may be provided. This also applies if a comparatively large number of certificates are loaded at once into the vehicle-to-X communication device subsequent to updating to cover a comparatively large period of time.

According to a further development, the digital certificates are stored in a data memory of the vehicle-to-X communication device. The data memory is conveniently a data memory suitable for the purposes of ensuring information security. According to one embodiment, provision is made for the certificates stored in a data memory to be replaced by the keys produced, in particular as soon as the key has been created. Savings in data memory space requirements may thus advantageously be made.

In principle, according to a further development, provision may alternatively or additionally be made to undertake production of the keys from the certificates by means of a central server and/or in particular by means of the electronic computing unit, in particular directly after receipt of the pseudonym certificates from the central server.

A vehicle may for example be a motor vehicle, in particular a private vehicle, a truck, a motorcycle, an electric vehicle or a hybrid vehicle, a watercraft or an aircraft.

An aspect of the invention further relates to a vehicle-to-X communication device, comprising a receiving apparatus for receiving digital certificates and an electronic computing apparatus, configured to generate cryptographic keys for signing vehicle-to-X messages to be emitted using the digital certificates, wherein the vehicle-to-X communication device is configured to undertake temporal spacing of receipt of the digital certificates and generation of the cryptographic keys using the digital certificates.

The vehicle-to-X communication device further conveniently comprises a data memory for storing the digital certificates and/or the generated keys. The data memory is conveniently a data memory suitable for the purposes of ensuring information security.

According to a further development, the electronic computing apparatus is configured such that computing resources of the electronic computing apparatus are merely designed to cover the computing resources needed for signature of the vehicle-to-X messages. It has been identified that the necessary computing resources for key production when required are negligible compared to the computing resources needed for signing vehicle-to-X messages to be emitted, for which reason designing the computing resources of the hardware security module merely in line with computing resources needed for signing the vehicle-to-X messages is convenient.

According to one embodiment of the vehicle-to-X communication device, the electronic computing apparatus comprises a hardware security module (HSM) for producing the keys from the certificates and/or for signing the vehicle-to-X messages with the keys.

According to a further aspect of the invention, the device is set up to carry out a method according to at least one of the above embodiments.

In a further development of the stated device, the stated device has a memory and a processor. In this way, the stated method is saved in the memory in the form of a computer program and the processor is provided to carry out the method when the computer program is loaded from the memory into the processor.

According to a further aspect of the invention, a computer program comprises program code means for carrying out all the steps of one of the stated methods when the computer program is run on a computer or one of the stated devices.

According to a further aspect of the invention, a computer program product contains a program code which is stored on a computer-readable data storage medium and which, when run on a data processing apparatus, performs one of the stated methods.

An aspect of the invention further describes use of the vehicle-to-X communication device according to at least one of the described embodiments in a vehicle or an infrastructure apparatus.

BRIEF DESCRIPTION OF THE DRAWINGS

Certain particularly advantageous configurations of aspects of the invention are indicated in the subclaims. Further preferred embodiments are also apparent from the following description of exemplary embodiments made with reference to figures, in which in schematic representation:

DETAILED DESCRIPTION OF THE PREFERRED EMBODIMENTS

Figure 1:
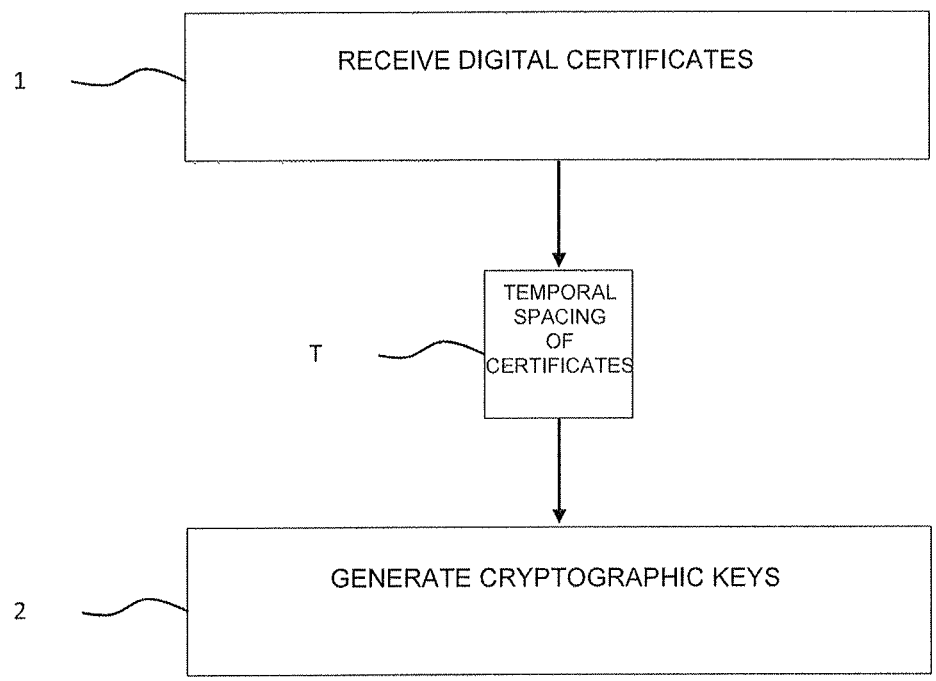
FIG. 1 shows an embodiment of the method according to an aspect of the invention and FIG. 2 shows an exemplary embodiment of a vehicle-to-X communication device according to an aspect of the invention.
Figure 2:
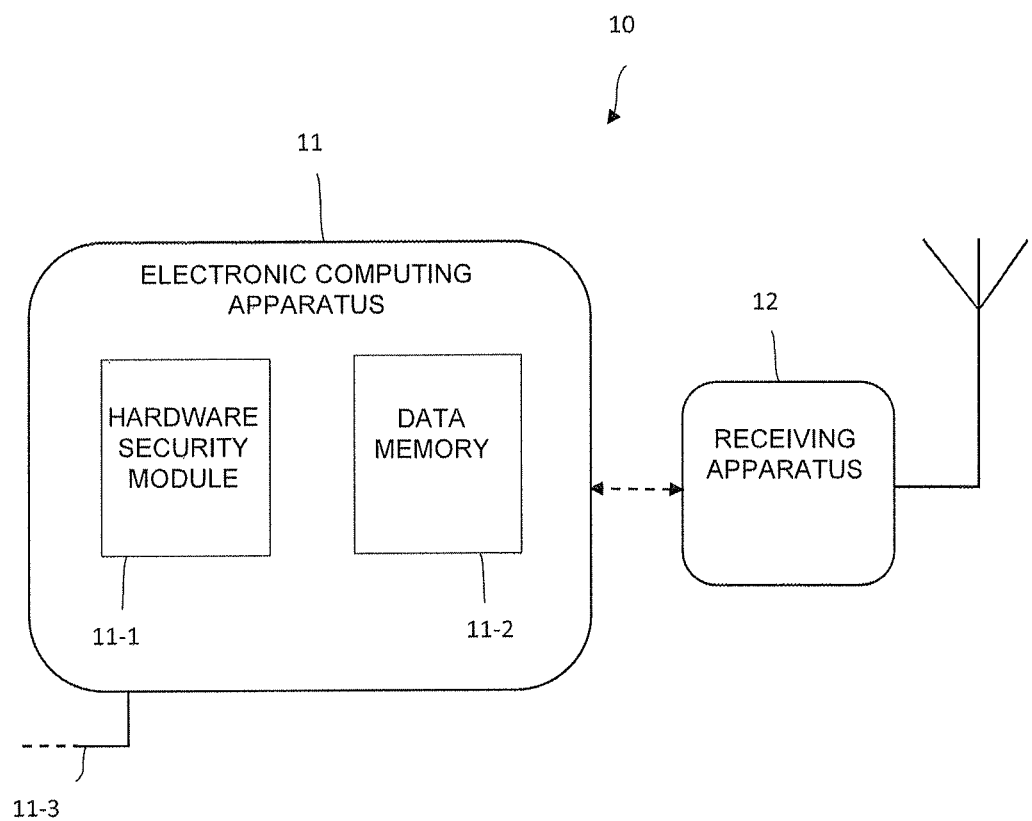

FIG. 1 shows an exemplary embodiment of the method for improving the utilization rate of vehicle-to-X communication for example for a vehicle-to-X communication device 10 according to the exemplary embodiment of FIG. 2. In a step 1 the vehicle-to-X communication device 10 receives by means of a receiving apparatus 12 digital certificates for signing vehicle-to-X messages to be emitted by a sender and stores these for example in a data memory 11-2 of an electronic computing apparatus 11. The certificates are provided for example by an external central server apparatus, which is not shown explicitly in the figures. Spaced apart temporally (shown in FIG. 1 by block T) from receipt of the digital certificates, a hardware security module 11-1 of the electronic computing apparatus 11 is used to generate cryptographic keys using the digital certificates in a step 2. Generation of a respective certificate here conveniently proceeds as required, in line in particular with the respective validity period of a respective certificate.

FIG. 2 shows an exemplary embodiment of a vehicle-to-X communication device 10 according to an aspect of the invention, which is configured to carry out the exemplary method according to FIG. 1. The vehicle-to-X communication device 10 comprises a receiving apparatus 12 for receiving digital certificates with an antenna. The receiving apparatus 12 is conveniently likewise configured to receive and emit vehicle-to-X messages. The vehicle-to-X communication device 10 further comprises an electronic computing apparatus 11 with a hardware security module 11-1, which is configured to generate cryptographic keys for signing vehicle-to-X messages to be emitted using the received digital certificates. In this respect, the vehicle-to-X communication device 10 or the electronic computing apparatus 11 or the hardware security module 11-1 is configured to undertake temporal spacing of receipt of the digital certificates and generation of the cryptographic keys using the digital certificates, as already described in relation to the embodiments of the method according to FIG. 1.

The vehicle-to-X communication device 10 furthermore comprises for example a data memory 11-2 for storing the received digital certificates and/or the generated keys. The data memory 11-2 is conveniently a data memory suitable for the purposes of ensuring information security.

The vehicle-to-X communication device 10 may furthermore be configured alternatively or in addition to receive digital certificates for example by means of a vehicle network 11-3, for example a data bus, such as in particular CAN, Ethernet or FlexRay.

If it turns out, over the course of the procedure, that a feature or a group of features is not absolutely necessary, then the applicant already requests now a wording of at least one independent claim in which the feature or group of features is no longer included. This may for example be a sub-combination of a claim present at the filing date or a sub-combination limited by further features of a claim present at the filing date. Such claims or combinations of features which are to be reworded should be understood also to be covered by the disclosure of this application.

It should also be pointed out that configurations, features and variants of aspects of the invention, which are described in the various embodiments or exemplary embodiments and/or shown in the figures, may be combined together as desired. Individual or multiple features are interchangeable as desired. Resultant combinations of features should be understood also to be covered by the disclosure of this application.

Back-references in dependent claims should not be understood to amount to renouncing independent objective protection for the features of the back-referenced subclaims. These features may also be combined as desired with other features.

Features which are only disclosed in the description or features which are disclosed in the description or in a claim only in conjunction with other features may in principle independently have significance which is essential to an aspect of the invention. They may therefore also be included individually in claims for the purpose of differentiation from the prior art.

In general, it should be noted that vehicle-to-X communication is in particular taken to mean direct communication between vehicles and/or between vehicles and infrastructure apparatuses. For example, it may thus be vehicle-to-vehicle communication or vehicle-to-infrastructure communication. If, in the context of this application, reference is made to communication between vehicles, this may in principle proceed for example in the context of vehicle-to-vehicle communication, which typically proceeds without mediation by a mobile radio network or a similar external infrastructure and which may therefore be distinguished from other solutions which are based for example on a mobile radio network. For example, vehicle-to-X communication may proceed on the basis of standards IEEE 802.11p or IEEE 1609.4. Vehicle-to-X communication may also be described as C2X communication or V2X communication. The sub-categories may be described as C2C (car-to-car) and V2V (vehicle-to-vehicle) or C2I (car-to-infrastructure) and V2I (vehicle-to-infrastructure). However, the an aspect of invention explicitly does not rule out vehicle-to-X communication with mediation for example via a mobile radio network.

The invention claimed is:

1. A method for improving the utilization rate of a vehicle-to-X communication device for vehicle-to-X communication, comprising:
   receiving digital certificates at substantially the same time by the vehicle-to-X communication device;
   generating, while a vehicle comprising the vehicle-to-X communication device is being operated and traffic safety assessment is being performed based on vehicle-to-X messages, cryptographic keys for signing the vehicle-to-X messages to be emitted using the digital certificates by an electronic computing apparatus; and
   temporal spacing apart the generation of each of the cryptographic keys from each other by a time period set to process the vehicle-to-X messages while the vehicle is being operated and the traffic safety assessment is being performed in between the generation of each of the cryptographic keys, the electronic computing apparatus executing other tasks during the time period; and
   generating the cryptographic keys for future vehicle-to-X message signatures when it is determined that the computing capacity of the electronic computing apparatus is not being fully utilized.

2. The method according to claim 1, wherein the temporal spacing is configured as required with regard to a respective certificate of the digital certificates and/or a respective key of the cryptographic keys.

3. The method according to claim 1, wherein the temporal spacing is configured as a function of a respective validity period of a respective certificate of the digital certificates.

4. The method according to claim 1, wherein the temporal spacing shifts the generation of each of the cryptographic keys from the time of the receipt of the certificates towards an actual and/or probable time of use of a respective certificate of the digital certificates and/or of the respective key of the cryptographic keys.

5. The method according to claim 1, wherein generation of a respective key using a respective certificate of the digital certificates proceeds directly before a validity period of the respective certificate comes into effect and/or directly subsequent to a validity period of a respective previous certificate of the digital certificates coming into effect.

6. The method according to claim 1, wherein the electronic computing apparatus determines the start of a validity period of a respective certificate of the digital certificates and initiates generation of a respective key of the cryptographic keys such that generation of the respective key is completed prior to the start of the validity period.

7. The method according to claim 1, wherein the digital certificates stored in a data memory are replaced by the cryptographic keys produced.

8. A vehicle-to-X communication device of a vehicle, comprising:
   a receiving apparatus receiving digital certificates at substantially the same time; and
   an electronic computing apparatus, configured to
      generate, while the vehicle is being operated and traffic safety assessment is being performed based on vehicle-to-X messages, cryptographic keys for signing vehicle-to-X messages to be emitted using the digital certificates, and generate the cryptographic keys for future vehicle-to-X message signatures when it is determined that the computing capacity of the electronic computing apparatus is not being fully utilized, wherein the vehicle-to-X communication device is configured to undertake temporal spacing apart the generation of each of the cryptographic keys from each other by a time period set to process, while the vehicle is being operated and the traffic safety assessment is being performed, the vehicle-to-X messages in between the generation of each of the cryptographic keys, the electronic computing apparatus executing other tasks during the time period.

9. The vehicle-to-X communication device according to claim 8, wherein the electronic computing apparatus is configured with computing resources designed to cover the computing resources needed for signature of the vehicle-to-X messages.

10. The vehicle-to-X communication device according to claim 8, wherein the electronic computing apparatus comprises a hardware security module for producing the cryptographic keys from the digital certificates and/or for signing the vehicle-to-X messages with the cryptographic keys.

11. Use of the vehicle-to-X communication device according to claim 8 in the vehicle or an infrastructure apparatus.

12. The vehicle-to-X communication device according to claim 9, wherein the electronic computing apparatus comprises a hardware security module for producing the cryptographic keys from the digital certificates and/or for signing the vehicle-to-X messages with the cryptographic keys.

* * * * *